(12) United States Patent
Padgett

(10) Patent No.: US 7,697,373 B1
(45) Date of Patent: Apr. 13, 2010

(54) METHOD FOR DERIVING 3D OUTPUT VOLUMES USING DIP VECTOR ANALYSIS

(76) Inventor: Michael John Padgett, 3709 Graustark St., Houston, TX (US) 77006

( * ) Notice: Subject to any disclaimer, the term of this patent is extended or adjusted under 35 U.S.C. 154(b) by 951 days.

(21) Appl. No.: 11/481,233

(22) Filed: Jul. 5, 2006

Related U.S. Application Data

(63) Continuation-in-part of application No. 10/721,983, filed on Nov. 25, 2003, now Pat. No. 7,206,782, and a continuation-in-part of application No. 11/158,118, filed on Jun. 21, 2005, now Pat. No. 7,266,041.

(51) Int. Cl.
*G01V 1/30* (2006.01)
*G01V 1/34* (2006.01)

(52) U.S. Cl. ............... 367/73; 367/38; 367/72
(58) Field of Classification Search ........ 367/38, 367/40, 43, 72, 73; 702/16
See application file for complete search history.

(56) References Cited

U.S. PATENT DOCUMENTS

| | | | |
|---|---|---|---|
| 5,001,677 A | | 3/1991 | Masters |
| 5,430,689 A | | 7/1995 | Rigsby |
| 5,440,525 A | * | 8/1995 | Dey-Sarkar et al. ......... 367/52 |
| 5,453,958 A | * | 9/1995 | Neff ........................... 367/70 |
| 5,583,825 A | | 12/1996 | Carrozzone |
| 5,586,082 A | * | 12/1996 | Anderson et al. ............ 367/73 |
| 5,675,551 A | * | 10/1997 | Sitoh .......................... 367/73 |
| 5,862,100 A | | 1/1999 | VerWest |
| 5,930,730 A | | 7/1999 | Marfut |
| 5,966,672 A | * | 10/1999 | Knupp ........................ 702/16 |
| 6,058,074 A | | 5/2000 | Swan |
| 6,131,071 A | | 10/2000 | Partyka |
| 6,292,754 B1 | | 9/2001 | Thomsen |
| 6,463,387 B1 | | 10/2002 | Runnestrand |
| 6,498,989 B1 | | 12/2002 | Pisetski et al. |
| 6,765,570 B1 | * | 7/2004 | Cheung et al. ............ 345/420 |

OTHER PUBLICATIONS

Freund, J.E. and Williams, F.J. "Dictionary/Outline of Basic Statistics" Dover 1966.
Fisher. R.A., and Yatex, F., "Statistical Tables for Biological, Agricultural, and Medical Research, 6th E., " Hafner Publishing, 1963.

(Continued)

*Primary Examiner*—Scott A Hughes
(74) *Attorney, Agent, or Firm*—Buskop Law Group, PC; Wendy Buskop

(57) ABSTRACT

A method and computer instructions on computer readable media for determining and analyzing spatial changes in the earth's subsurface associated with dip vectors measured using 3D data in regions near a fluid contact or seismic flat spot event. The method obtains seismic attribute data, then derives corresponding 3D dip and azimuth as a 3D volume and derives corresponding 3D reliability volumes or 3D censor volumes. A set of vector is formed within a local subvolume of interest interior to the focused subvolume of interest for each reliability location, and a subset of local vectors within a user specified deviation of the azimuth of the structural dip vector are identified. A set of candidate flat spot dip vectors within the local subvolume of interest are identified enabling a significance measure for each vector within the set of candidate flat spot dip vectors to be determined.

19 Claims, 13 Drawing Sheets

3D Output Volume Slice in a surface containing significance measures at reliability locations

OTHER PUBLICATIONS

Mandel, J "The Statistical Analysis of Experimental Data." Dover, 1964.

Lyons, L., "Statistics for nuclear and particle physics," Cambridge University Press, 1986.

Weisstein, Eric W., "Hotelling T2 Distribution." From Mathworld—A Wolfram Web Resource. http://mathworld.wolfram.com/HotellingT-SquaredDistribution.html.

"The significance of the difference between two means when the population variances are unequal" by B.L. Welch, 1938, 'Biometricka' 29, pp. 350-362.

W.V. Behrens, "Ein beitrag zuf Fehlerberechnung bei wenigen Beobachtungen", 'Landwirtschaftliche Jahrbuecher' 68, pp. 807-837.

"On the Behrens-Fisher Problem: A review", by Seock-Ho Kim and Allan Cohen, University of Wisconsin, 1995. Paper presented at the annual meeting of the Psychometric Society, MN.

Hair, J.F. Black, W.C., Babin, B.J.,Anderson, R.E., Tatham, R.L., "Multivariate Data Analysis, 6th Ed.," Prentice Hall 2006, especially chapters 1, 5, and 8.

Hotelling, H., "Multivariate Quality Control Issustrated by the Air Testing of Sample Bombsights." in C Eisenhart, M.W. Hastay, and W.A. Wallis, eds., (cont'd on next line).

"Techniques of Statistical Analysis for Scientific and Industrial Research and Production and Managment Engineering." New York: McGraw-Hill, 1947.

* cited by examiner

Vertical slice through a focused Subvolume of Interest

Seismic Attribute and computed local dip vectors data traces of non-null 3D dip data and non-null 3D azimuth data as illustrated by the small arrows 3D Seismic Output Volume Slice in a surface containing candidate flat spot dip vectors at reliability locations 3D Output Volume Slice in a surface containing flat spot dip vectors at reliability locations depicting significance measures for each vector with a set of candidate flat spot dip vectors 3D Output Volume Slice in a surface containing significance measures at reliability locations

Figure 12 continued

| Computing a flat spot direction vector dip magnitude from the structural dip magnitude using (1) petrophysical data at each reliability location, or (2) a user specified value of the structural dip magnitude for each reliability location. | 420 |

| Determining a flat spot direction vector dip magnitude error quantity. | 422 |

| Forming a set of candidate flat spot dip vectors when one or more local vectors are within the local subvolume of interest and the one or more local vectors are statistically consistent with the flat spot direction vector. | 424 |

| Computing a significance measure for each vector within the set of candidate flat spot dip vectors, wherein each significant measure has a significance location corresponding to each local vector within the set of candidate flat spot dip vectors. | 426 |

| Forming a 3D output subvolume comprising the significance measures for all vectors in the set of candidate flat spot dip vectors. | 428 |

METHOD FOR DERIVING 3D OUTPUT VOLUMES USING DIP VECTOR ANALYSIS

CROSS REFERENCE TO RELATED APPLICATIONS

The present application is a Continuation-in-Part to U.S. patent application Ser. No. 10/721,983 filed on Nov. 25, 2003, now U.S. Pat. No. 7,206,782 in addition to U.S. patent application Ser. No. 11/158,118 filed on Jun. 21, 2005 now U.S. Pat. No. 7,266,041.

FIELD

The present embodiments relate generally to a method of determining and analyzing spatial changes in the earth's subsurface associated with measurements of local dip vectors.

BACKGROUND

The goal of hydrocarbon exploration is to find porous and permeable geologic deposits containing high pore-space saturations of hydrocarbons, under sufficient pressure to allow some mode of commercial production. In pursuit of this goal, companies, countries and individuals collect and process many types of geophysical and geological data. The data is often analyzed to find anomalous zones that can reasonably be attributed to the presence of hydrocarbons.

The usage of 2D and 3D seismic data anomalies has been a standard practice in the petroleum industry since the 1960s. Other geologic and geophysical data anomalies have been tried, sometimes successfully, for over a century. These include various gravimetric, electromagnetic, chemical, biological and speculative methods.

The usage of anomalies for oil and gas detection has been plagued by several problems. First, most remote sensing anomalies (e.g., a 3D seismic amplitude anomaly) cannot be directly tied to a rock property that could be measured in the laboratory or using well logs. Much effort is expended attempting to tie observed anomalies to known rock responses by modeling the expected attribute response or otherwise correlating with a known producing reservoir. This work is often based on the experience of the practitioner.

A second problem is that the anomalies themselves are often evaluated or tied to response models in a qualitative manner. With qualitative assessment as the basis, quantitative, objective and reproducible error analysis has not been possible.

A third problem is that a basic physical property at work in hydrocarbon reservoirs is that both oil and gas are less dense than water. This generally causes oil and gas to accumulate up-structure in the pore-space of potential reservoir rocks. The higher water saturations are found, generally, down-structure. The exception to this is the case of heavy oil which may have a density greater than that of water. In the case of heavy oil, water may accumulate up-structure. Generally, the separation of saturations is driven by gravity. When such a separation of fluid types occurs, flat interfaces, in depth, are expected to form.

This separation causes numerous possible classes of data attribute response. First, the hydrocarbon reservoir will have one response for each hydrocarbon type. The water-saturated part of the reservoir may have a second data response and the interfacial area a third type of attribute data response.

The present invention is designed for the detection, quantification and evaluation of the depth and location of interface between lighter and heavier saturating fluids as exhibited in a data attribute dataset to locate the interface between a water reservoir and a hydrocarbon reservoir.

The lack of quantification, error analysis, subjectivity of analysis and data quality issues cause variations in the appraisal of data anomalies in oil and gas exploration and production projects. It is not uncommon for different individuals or companies to examine the same anomaly and reach irreconcilably, different conclusions. In many cases, explaining quantitatively why the anomaly of one prospect should be "believed or trusted" more than that of another prospect has not been possible. This lack of trust causes different entities to make drastically different investment decisions concerning prospects based on the same underlying data.

The present embodiments are designed for the detection, quantification and evaluation of data anomalies in the search for producible hydrocarbon deposits. The present embodiments are designed to simultaneously detect, quantify and summarize the interfaced zone between the hydrocarbon reservoir part and the water reservoir part of the data, and between hydrocarbon reservoirs having different fluid densities or saturations. The embodiments address the case of multiple hydrocarbon zones, e.g., gas over oil over water. The embodiments are designed to test the model wherein gas is less dense than oil and oil is less dense than water and the case of heavy oil being more dense than water or than gas, with data responses varying by structural position.

The current embodiments are designed to function in areas of low signal-to-noise and aid in the determination of data suitability for hydrocarbon detection for the expected rock physics environment. The current embodiment, therefore, can be applied to the detection of subtle hydrocarbon related data anomalies.

A need exists for a method to scan large amounts of geophysical data sets systematically and simultaneously to find the presence of hydrocarbons. The method should honor non-statistical and highly structured (due to geology and rock properties) host rock geophysical responses. The method should honor small changes in the host rock layering or composition in constructing background data volumes for normalization and scanning.

The present embodiments meet these needs.

BRIEF DESCRIPTION OF THE DRAWINGS

The detailed description will be better understood in conjunction with the accompanying drawings as follows.

Figure 1:
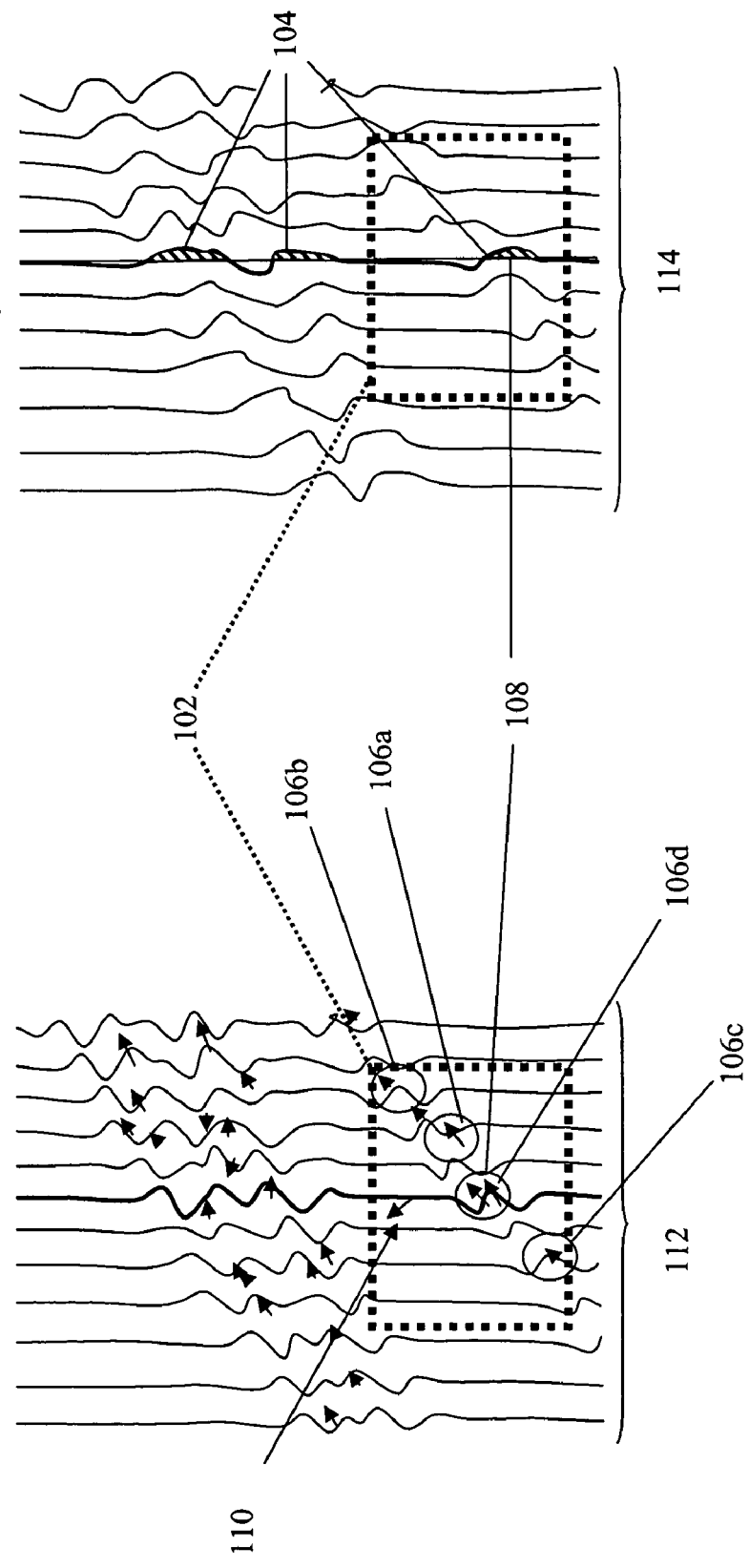
FIG. 1 is an example of derived corresponding 3D reliability volumes and 3D censor volumes for a set of 3D dip and azimuth data.

The present embodiments are detailed below with reference to the listed Figures.

DETAILED DESCRIPTION OF THE EMBODIMENTS

Before explaining the present embodiments in detail, it is to be understood that the embodiments are not limited to the particular embodiments and that they can be practiced or carried out in various ways.

The present method detects changes in a data set associated with an interface between a water reservoir and a hydrocarbon reservoir in a given focused area for a given geologic unit.

The method operates as a highly reliable low cost model, which will save expense in drilling in non-productive areas, and will reduce the amount of destruction to wilderness, as the intended Alaska drilling will incur, because of the method being able to focus only on the oil and water or natural gas and water interface for accurate drilling, reducing the dry hole phenomena.

In addition, the method was conceived to operate in high noise, low signal to noise environments, where the data quality is poor. A benefit for operating in high noise, low signal to noise environments, is that computation time for determining the exact spot to drill is dramatically reduced. Another benefit of being able to operate in a high noise, low signal to noise environment is avoid the need to collect additional seismic data before exploratory drilling.

The method was designed to operate on subtle hydrocarbon indicators, such as seismic amplitude for generally pure oil reservoirs, deep gas reservoirs, or Class II or Class I AVO reservoirs. By operating on subtle hydrocarbon indicators, the method enables the user to perform volume based flat spot and fluid contact detection which has not been done successfully. The advantage of being able to perform flat spot and fluid contact detection is that fewer dry holes and therefore less drilling will occur.

The method determines errors and uncertainties in data attribute results relative to a given hydrocarbon reservoir and a corresponding water reservoir and associated interfacial region. By determining errors and uncertainties, this reduces again, the dry hole drilling phenomena.

The method addresses the case of multiple hydrocarbon zones, such as, gas over oil over water. By addressing multiple hydrocarbon zones simultaneously, this gives the user the benefit of more accurately determining possible reserves before development decisions are made and of optimally placing development wells and production facilities.

The method is designed to be used for situations where gas is less dense than oil and oil is less dense than water, and data responses vary by structural position, but transition in a very narrow range of depths or seismic times. A benefit if being able to operate for this situation is that development wells and completions can be more efficiently constructed.

The method operates will when oil is highly viscous and has a low API gravity over water and the data responses vary by structural position in a very narrow range of depths or over multiple seismic times. An advantage of the ability to operate when oil is highly viscous is that development wells and completions can be more efficiently constructed.

Quantification and replication make the output of this method suitable for quantitative comparison with petrophysical analysis, response modeling analysis and geologic analysis, such as, fit to structure analysis.

The method uses a focused sub-volume in a geological structure as a volume of investigation. The volume of investigation within the context of this patent application, applies to either a volume of a hydrocarbon reservoir, an associated water reservoir, contiguous combinations of these reservoirs or combinations of these reservoirs with other reservoirs.

The method uses an attribute file corresponding to volumetric coordinates. The volumetric coordinates can be an X-Y-Z prospect coordinate system, X-Y-Z field development system, internal 3D seismic survey coordinates, and combinations thereof.

The 3D seismic data from which the attribute data is derived must be sufficiently continuous to allow the computation of structural dip and azimuth.

The attribute file in the method can be a member of one of the following data sets:
  a. a set of compiled seismic reflection data processed using a defined attribute generating algorithm for a horizon of interest;
  b. a set of compiled seismic reflection data processed using a defined attribute generating algorithm;
  c. a set of compiled seismic velocity data processed using a defined attribute generating algorithm;
  d. a set of compiled seismic velocity data processed using a defined attribute generating algorithm;
  e. a set of collected geologic measurements;
  f. a set of petro-physical measurements; and
  g. combinations thereof.

The invention relates to a method of determining and analyzing spatial changes in the earth's subsurface. The invention specifically relates to a method and computer instructions on computer readable media for determining the existence of a hydrocarbon water interface and/or the existence of a hydrocarbon/hydrocarbon interface.

The invention relates to a particular focused subvolume of interest within a 3D data volume.

The steps of this method include obtaining seismic attribute data as a 3D data volume. Examples of usable seismic attribute data include seismic amplitude data, instantaneous phase data, reflection strength, inverted seismic data and/or seismic RMS data.

3D dip and azimuth as at least one set of 3D volume data is then obtained. At least one set of 3D volume data must be used in the method.

Given the 3D dip and azimuth as a 3D volume data, corresponding 3D reliability volumes or 3D censor volumes which are representative of portions of the volume of interest within in which a reliable dip and azimuth are derived. An example of derived corresponding 3D reliability volumes or 3D censor volumes are depicted in FIG. 1.

A focused subvolume of interest within the 3D data volume is then selected, see FIG. 1 element 10 as the focused subvolume of interest.

Locations within the focused subvolume of interest having a signal, for example greater than 10% of a mean value, within the 3D reliability volumes or 3D censor volumes across the focused subvolume of interest are then identified, as reliability locations for further computation and consideration depicted in FIG. 1. The example of greater than 10% can vary according to the location parameters. The selection of a cutoff criteria, like 10% greater (or less) than the mean, is determined by the analyst based on geologic conditions, data integrity, noise level and the need to generate a statistically significant set of reliability locations.

FIG. 1 depicts two traces, a seismic attribute and computed local dip vectors data traces 112, and reliability or censor data traces with a cut-off shaded on a sample reliability or censor trace 114. In each of these two traces there is a selected subvolume of interest 102. In the seismic attribute and computed local dip vectors data traces there is additionally a rejected local dip vector not at a reliability location 110. The sequence of reliability locations in the circled areas are also pointed out in 106. In the reliability or censor data traces with a cut-off shaded on a sample reliability or censor trace there are three reliability location grid location areas 104. For both traces there are local dip vectors at two reliability location 108.

Figure 2:
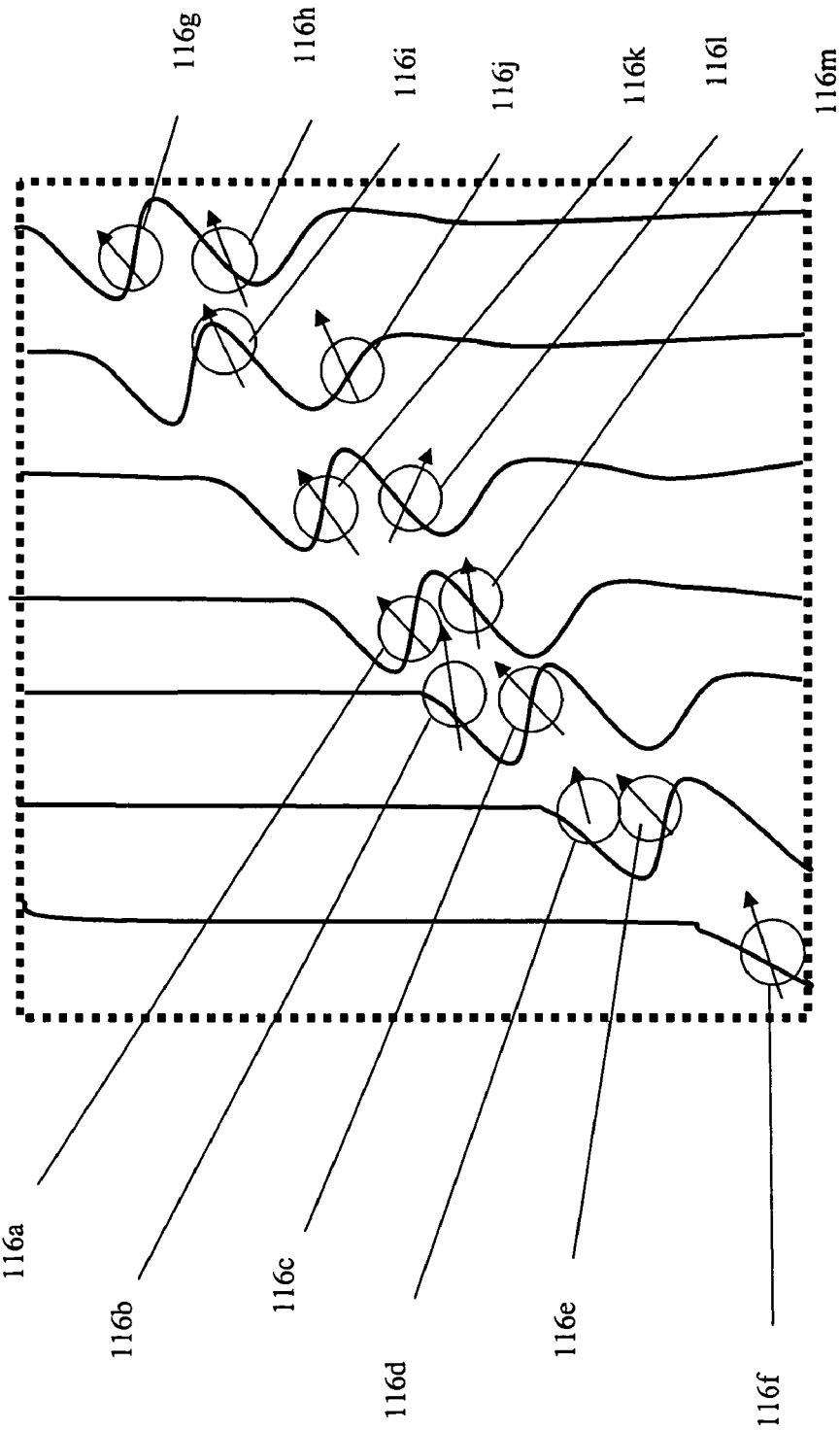
FIG. 2 depicts a group of vector dips around a sequence of reliability locations.

A plurality of vector dips around the reliability locations in the sequence of the reliability locations are identified. FIG. 2 depicts a group of local vector dips at reliability locations shown as elements 118. In addition, FIG. 2 depicts the sequence of reliability locations in the circled grid node location 116. These elements 116 and 118 are shown on a vertical slice through a selected subvolume of interest of a seismic attribute and computed local dip vectors data trace.

Figure 3:
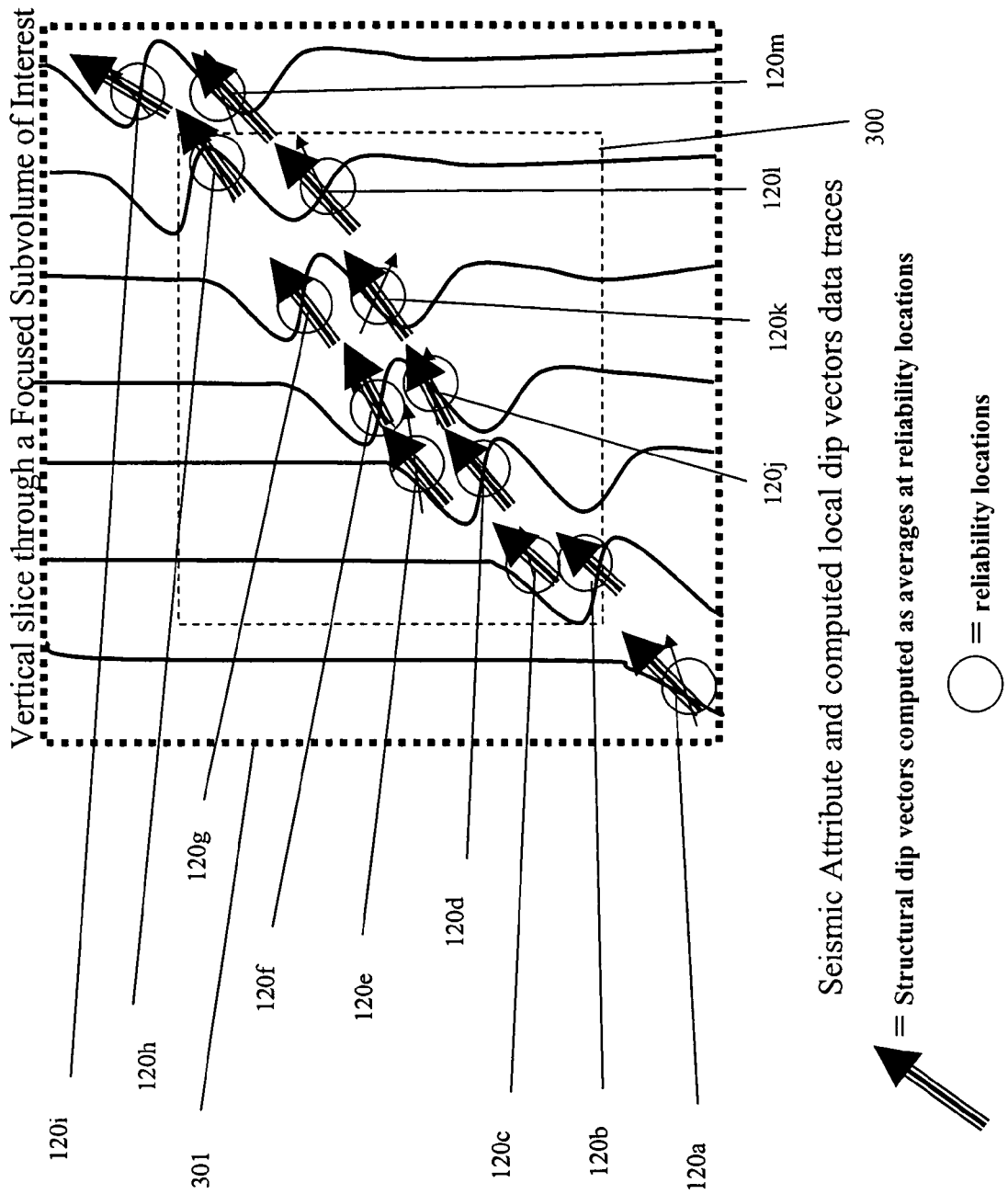
FIG. 3 shows computed structural dips for reliability locations of FIG. 2.

An average for the plurality of vector dips around each reliability location is computed using a formula such as the example one shown below:

Given a sequence of reliability locations, "Seq" with internal index, r, where r=1, 2, ... Length(Seq), for each dip vector component Vi (i=1, 2, 3) at a reliability location at the grid location X(I,J,K), the structural dip vector components Si may be defined as:

$$Si(X(I,J,K)) = \text{Sum over } r\{Vi*W(X(I,J,K), Seq(r))\}/\text{Total\_Weight}$$

where $W(X(I,J,K), Seq(r))$ is the weight function of $X(I,J,K)$ relative to $Seq(r)$ where Total_Weight=Sum over $r\{W(X(I,J,K), Seq(r))\}$ The average of the plurality of vector dips forms at least one structural dip for each reliability location. FIG. 3 shows structural dips 120 for a reliability location. The structural dips are for the sequence of reliability locations in the circled grid node locations. Between 1 and N structural dips may be computed for any one reliability location in the sequence of the reliability locations, where N is the length of the sequence of reliability locations. In this method it is contemplated that all reliability locations have at least one structural dip vector, normally computed as an weighted average of dip vectors at nearby reliability locations as described by the equation above.

FIG. 3 also shows a local subvolume of interest 300 interior to the focused subvolume of interest 301 of each reliability location wherein the local subvolume of interest contains 3D dip and azimuth data as a set of vectors is next identified. The local subvolume of interest is normally chosen to include enough grid points above and below a reliability location such that a typical pay sand in the geographic area would be included either above or below the reliability location. For example, if a typical pay sand is 200 ft thick and the background interval velocity is 8000 ft/sec with a 4 MSec sampling rate, then a typical pay sand would be spanned in 50 MSec of 2-way time or 12.5 samples. The local subvolume of interest would then be chosen to be 13 samples above and 13 samples below, spanning a volume of rock roughly 400 feet thick. If the inline and cross-line sampling interval is around 110 feet, then it is normally to sample at least 400 feet in each direction, yielding local subvolume of 8 grid nodes across in each of the x and y (or inline and cross-line) directions. Larger or smaller local subvolumes, may be chosen for the specific needs of a given geologic problem]

Figure 4:
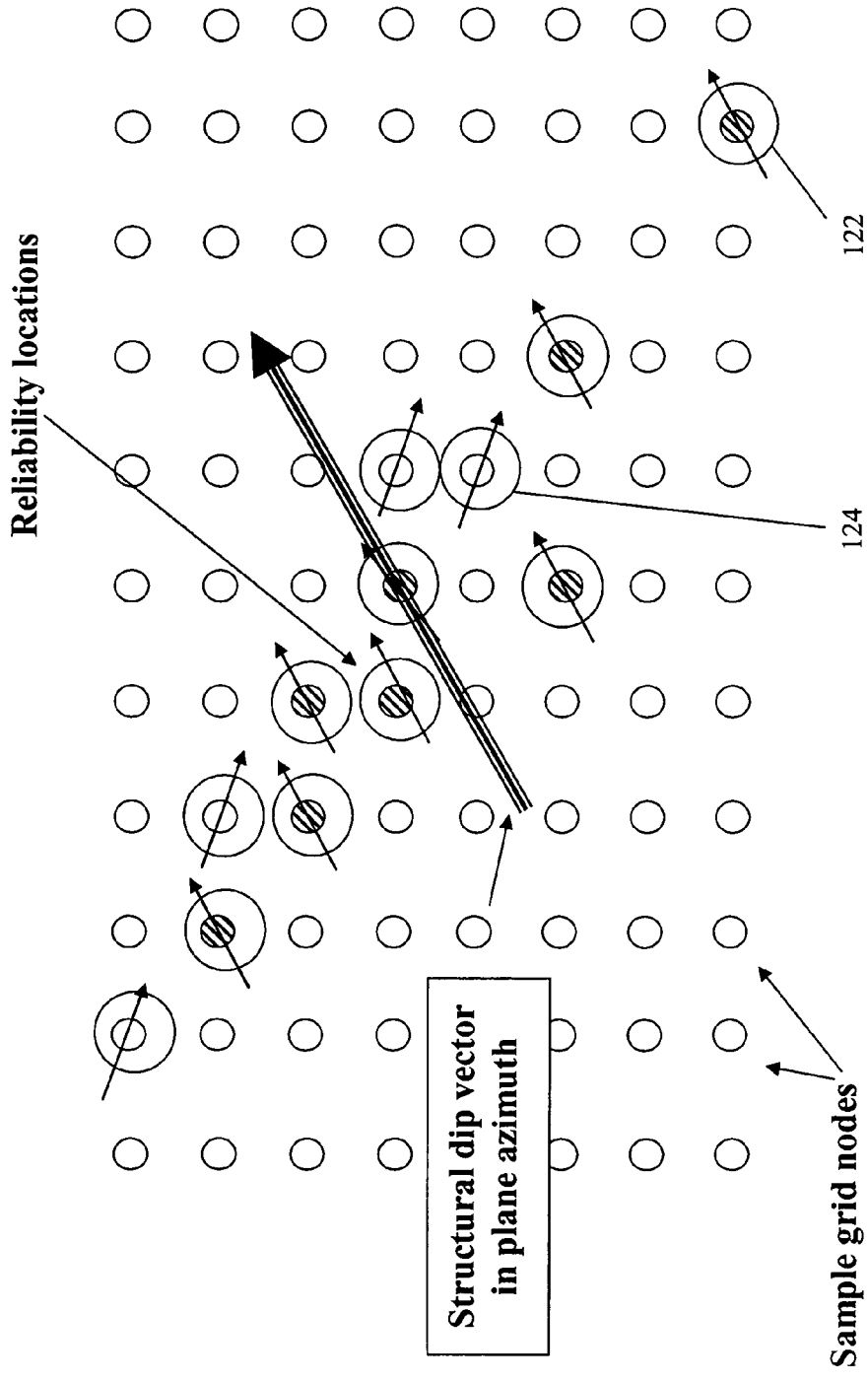
FIG. 4 depicts a set of local vectors within a set of vectors around the azimuth of a structural dip vector.

A set of local vectors is formed from a set of vectors that are within a user specified amount of the azimuth of the structural dip vector (for example 1 standard deviation of the azimuth of the structural dip vector). FIG. 4 depicts this set of local dip vectors at an azimuth direction at a reliability location as element 124. Hatched circles 122 in FIG. 4 refer to reliability locations with local dip vectors that are parallel to the structural dip vectors. The selection of a cut-off criteria, like 1 standard deviation, of the azimuth is determined by the analyst based on geologic conditions, data integrity, noise level and the need to generate a statistically significant set of local dip vectors.

Figure 5:
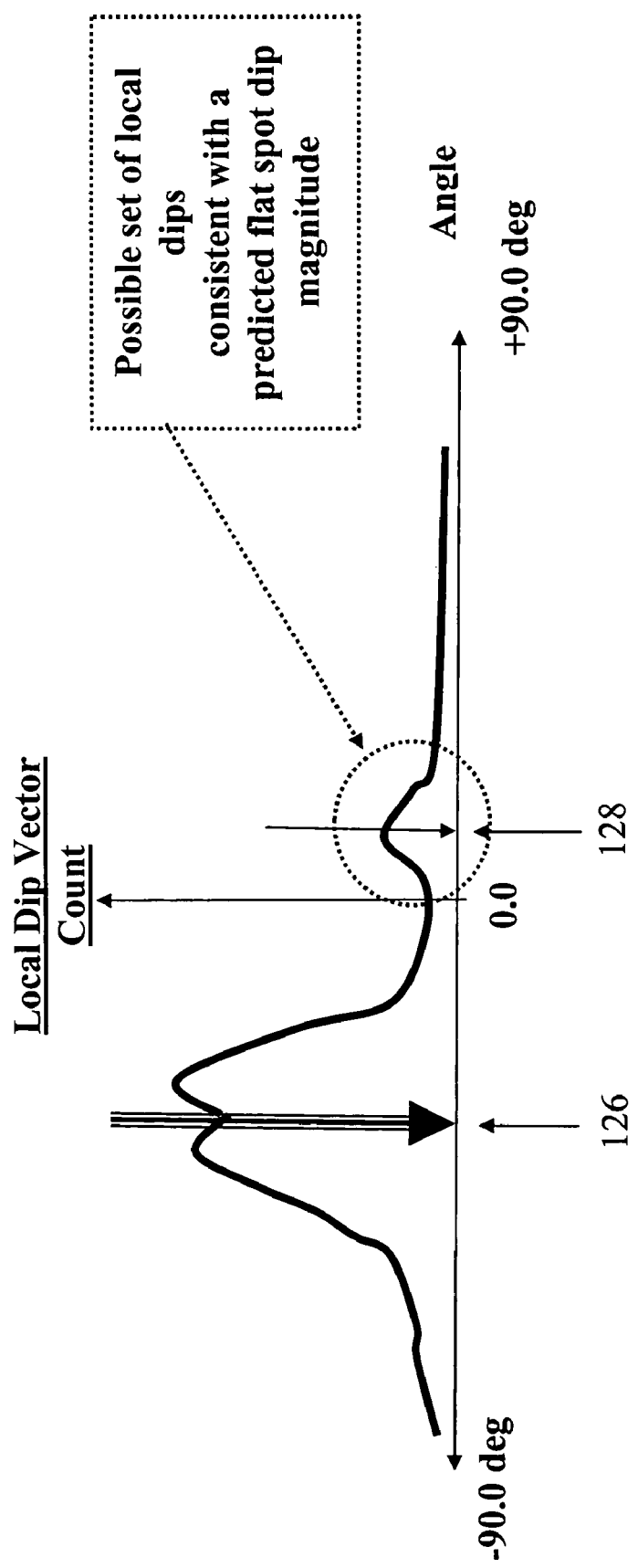
FIG. 5 is an exemplary histogram of dip magnitudes of vectors within the set of local vectors.

Next the dip magnitudes for each vector within the set of local vectors is formed and a histogram is created of the dip magnitude of these vectors. A flat spot direction vector for each structural dip vector at the reliability location, wherein the flat spot direction vector has a flat spot direction vector azimuth equaling to +/−1 standard deviation of the structural azimuth, or a similarly user specified amount is determined. The flat spot direction vector has a flat spot direction vector azimuth equaling to +/−1 standard deviation of the structural azimuth, or equaling a similarly user specified amount. FIG. 5 depicts an exemplary histogram usable in computing the significance measure of an exemplary local parallel set of vectors. The structural dip vector dip is shown as 126 in FIG. 5 and the flat spot dip vector dip prediction is shown as 128.

Figure 6:
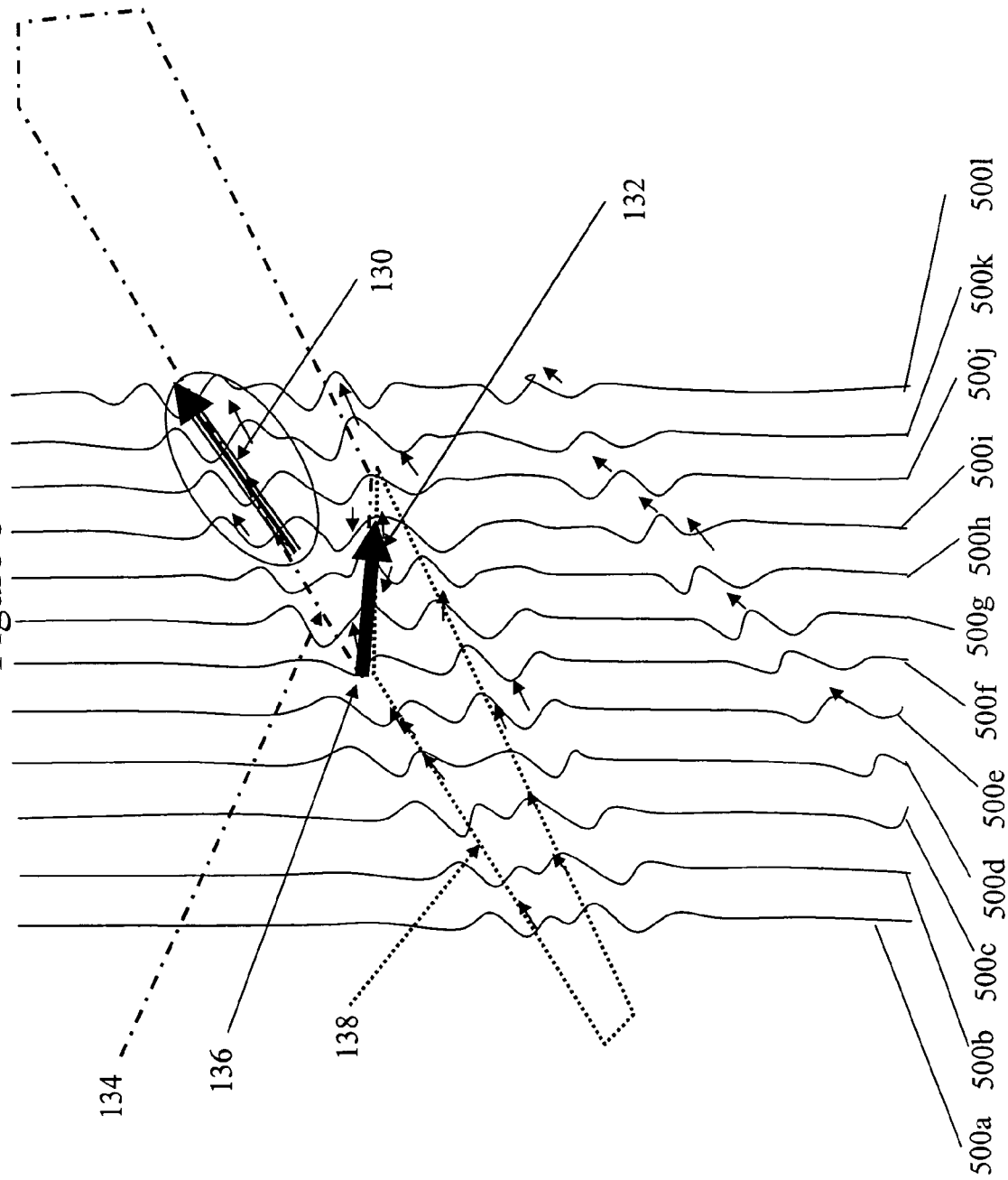
FIG. 6 portrays an exemplary flat spot direction vector.
Figure 7:
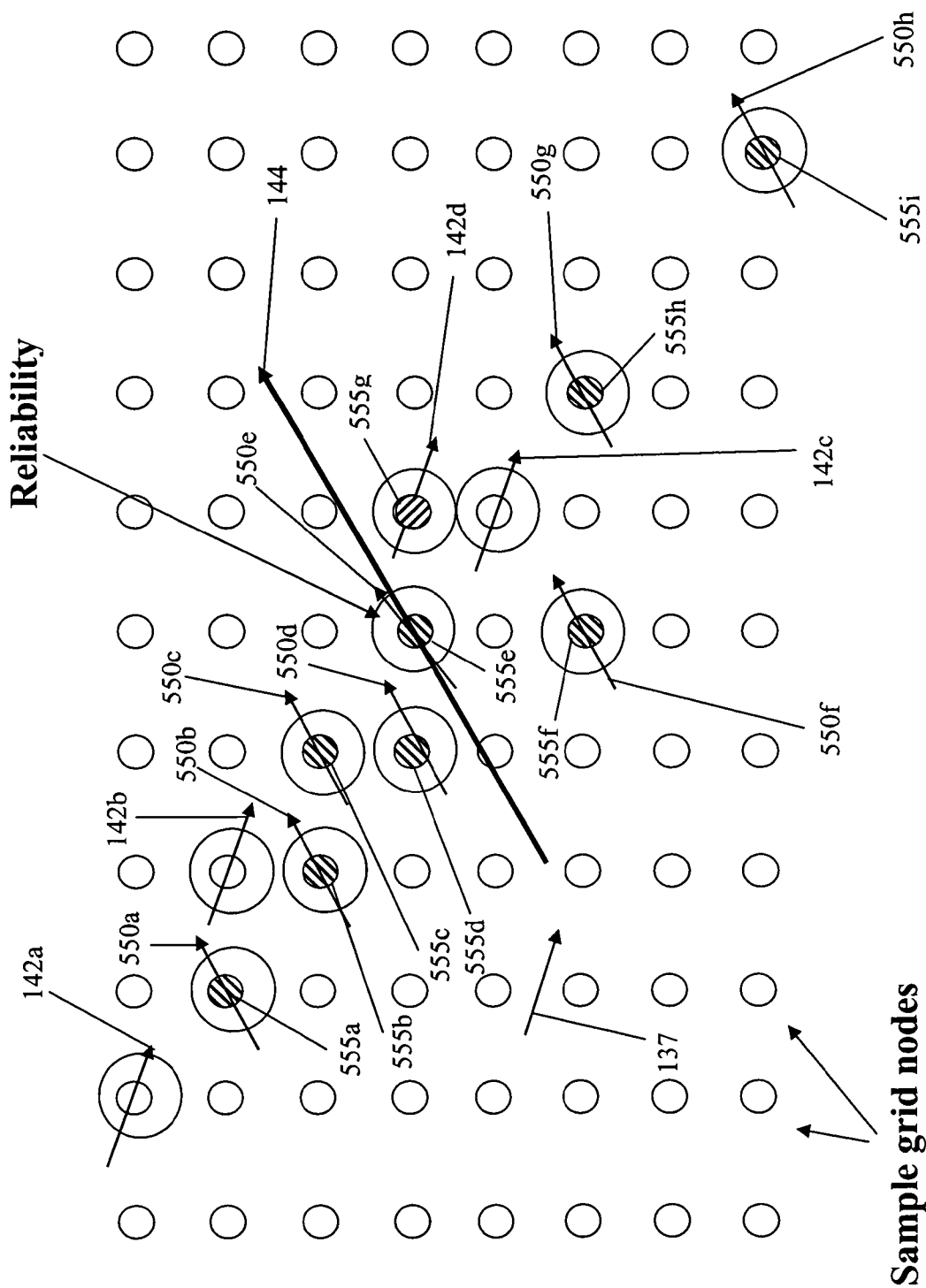
FIG. 7 shows an exemplary set of candidate flat spot dip vectors formed by an embodiment of the invention.

A flat spot direction vector is then determined for each structural dip vector at the reliability locations as shown in FIG. 6. The flat spot direction vector 136 has a flat spot direction vector azimuth equaling 137, as shown in FIG. 7, to a user specified deviation (for example to +/−1 standard deviation) of the structural azimuth, or a user specified value as described above. In the case where the flat spot direction vector dip magnitude as described below is close to zero (+/−1.5 degrees of structural dip), the azimuth of the flat spot direction vector is indeterminate with the vector pointing in any direction in the X-Y plane. FIG. 6 depicts seismic attribute data traces 500a, 500b, 500c, 500d, 500e, 500f, 500g, 500h, 500i, 500j, 500k and 500l. A structural dip vector 130 is shown, and the actual fluid contact and flat spot event is the region 132, encompassing a modified group of seismic attribute data traces. The hydrocarbon reservoir area 134 and the water reservoir area 138 are also shown in FIG. 6.

A flat spot direction vector dip magnitude is then computed from the structural dip magnitude using (1) petrophysical data at each reliability location, or (2) a user specified value of, for example +/−20%, of the structural dip magnitude for each reliability location. The choice of a specific user specified value of which +/−20% is an example is made by the analyst or user based on geologic conditions, data integrity, noise level and the need to generate a geographically consistent set of reliability flat spot direction vectors.

The following in an example of flat spot direction vector dip magnitude computed from the structural dip magnitude using petrophysical data:

The following is in an example of flat spot direction vector dip magnitude computed from the structural dip magnitude using petrophysical data: Vs=8000 ft/s, Vhc=7100 ft/s, dTz(r)=2.1 samples/trace then the flat spot dip vector dip magnitude in the units of samples per trace is **2.1*(7100−8000)/7100=−0.27**.

The following is an example of flat spot direction vector dip magnitude computed from the structural dip magnitude using a user specified value, for example −5%: dTz(r)=2.1 samples/trace, then the then the flat spot dip vector dip magnitude in the units of samples per trace is −0.05 *2.1=−0.105.

In the case of depth migrated data or the lack of availability of dTz(r) in the units of time samples/trace, dTz(r) can be defined as 2*tan(structural dip)/Vs and where the flat spot dip vector dip magnitude can be similarly scaled into depth, if necessary for the seismic attribute dataset Z axis units in use.

An error quantity is then determined for the flat spot direction vector dip magnitude such as an error quantity of the error in the computed mean flat spot dip vector dip magnitude at a given reliability location and using that error quantity, forming a set of candidate flat spot dip vectors when one or more local vectors are within the local subvolume of interest and the one or more local vectors are statistically consistent with the flat spot direction vector.

If the flat spot vector dip magnitude is close to zero, then the flat spot direction vector is located on or near the X-Y plane and the azimuth is indeterminate. In this case the set of set of candidate flat spot dip vectors may have any azimuth (0-360 degrees) with little or no preferential direction detectable in the data.

A set of candidate flat spot dip vectors statistically consistent with the flat spot direction vector are formed using multivariate cluster analysis. FIG. 7 depicts a set of candidate flat spot dip vectors formed by this step shown as elements 550a-550h. FIG. 7 depicts a 3D seismic attribute volume slice perpendicular to the Z axis of FIG. 1. Hatched circles 555a-555i depict reliability locations with local dip vectors that are parallel to the flat spot direction vector 144. Small arrows 142a-142d depict local dip vector azimuth direction at a reliability location.

A significance measure for each vector within the set of candidate flat spot dip vectors is then computed. Each significant measure has a significance location corresponding to the reliability location of each local vector within the set of candidate flat spot dip vectors. The hatched central section of each candidate flat spot dip vector is the significance measurement shown as elements 555a-555i. The analysis of the significance of each vector within the set of parallel vector forming a subordinate peak corresponding to the expected direction of a flat spot dip vector, can be done in several ways. Three such analysis methods are described now. First, by computing the flat spot dip vector dip and azimuth (and corresponding standard deviations) population analysis of the candidate dip vectors can be performed using a user preferred selection of one or two-sample, z, T, Mahalanobis distance between two populations or Behrens-Fisher tests on the resulting population taken from those dip vectors having azimuths which are within 1-2 standard deviations of structural dip azimuth. These tests are described in standard statistical textbooks.

Let population 1 be the set of dip vectors within the local subvolume of interest which are not members of the set of candidate flat spot dip vectors. Let population 2 be the set of candidate flat spot dip vectors. For each population 1 and population 2, form a dip vector population dp1 with indices jj, and a dip vector population dp2 with indices ee. Each member of dp1 is denoted by its index as dp1_jj and each member of dp2 is denoted by its index dp2_ee. The count, mean and standard deviation of dp1 are n1, mn1 and st1. SN1 is defined to equal sqrt(st1*st1/n1). n1, mn1 and st1 define a normal sampling distribution NM1 which is a function of the normal parameters st1 and sampling variable mu1. The t distribution for population 1 is t1. The count, mean and standard deviation of dp2 are n2, mn2 and st2. SN2 is defined to equal sqrt(st2*st2/n2). n2, mn2 and st2 define a normal sampling distribution NM2 which is a function of the normal parameters st2 and sampling variable mu2. The t distribution for population 2 is t2. The fiducial distribution delta is defined as:

$$\text{delta} = mn2 - mn1 + t2 * SN2 - t1 * SN1,$$

The Fisher tau statistic is defined as:

$$tau = (\text{delta} - (mn2 - mn1))/\text{sqrt}(SN1 + SN2)$$

and tau=t2*cos(theta)−t1*sin(theta) where tan(theta)=sqrt(SN1/SN2) and where the t statistics t1 and t2 are functions of sampling coordinates nu1 and nu2 respectively. A confidence level and corresponding significance level for a Type 1 error level alpha is used to define a fiducial interval, FI, of 100*(1−alpha) where $$FI = mn2 - mn1 +/- tau\_alpha\_2(nu1, nu2, theta) * \text{sqrt}(SN1 + SN2)$$

where Probability(tau>tau_alpha_2(nu1, nu2, theta))=alpha./2. The computation of alpha corresponding to each member of the set of candidate flat spot dip vectors defines a significance measure for each member of the set of candidate flat spot dip vectors. The significance levels which are below a user specified cut-off are set to null.

Second, by performing bivariate analysis of the candidate dip vectors having dip magnitudes within n standard deviations (n, real and >=0) of the expected flat spot dip magnitude, see references 3-6. Third, by selecting a population taken from those local dip vectors having azimuths which are within nA standard deviations of structural dip azimuth (nA, real and >=0), forming a histogram of dip angles, and finding the peaks of the histogram. If a peak exists within nB expected flat spot standard deviations of the expected flat spot dip vector dip, then finding the closest peak to the flat spot dip vector dip. Using those vectors not part of the candidate flat spot peak, forming a mean and standard deviation of the background. Computing the expected background level within n standard deviations of the closest peak, subtracting the background from the original histogram and assigning at statistic confidence level to each candidate dip vector.

The fourth method of analysis involves using either multiple discriminant analysis or logistic regression, for example as in Hair, J. F., Black, W. C., Babin, B. J., Anderson, R. E., Tatham, R. L., "Multivariate Data Naalysis, 6$^{th}$ Ed.," Prentice Hall 2006, especially chapters 1, 5 and 8. to construct or refine the set of candidate flat spot dip vectors and to compute a significance measure for each final member of the set. The variate used in the multiple discriminant analysis and/or the logistic regressions is a discriminant Z score. This allows the difference between the centroids to be analyzed using a modified Mahalanobis D$^2$ distance. The Z score variate used here involves the distances in parameter space from the structural dip vector for each realiability location within the local subvolume of interest to each member of the set of candidate flat spot dip vectors and to each local dip vector in the local subvolume of interest which is not a member of the set of candidate flat spot dip vectors. The parameters, Pa1 to Pa19, to be used in the distance calculation include the dip vector components in the X, Y and Z directions (Pa1, Pa2 and Pa3), the inverse distances squared (linear in X,Y,Z space, Pa4), Pa5, Pa6 with a maximum value to avoid division by zero or numerical overflow) from a reliability location to each member of the set of candidate flat spot dip vectors. The local dip vector azimuth, dip magnitude and reliability value (Pa5, Pa6 and Pa7) at each reliability location. The value and standard deviation of the components, and the azimuth and dip magnitude for each structural dip vector (Pa8, Pa9, Pa10, Pa11, Pa12, Pa13, Pa14, and Pa15) at each reliability location. The difference between the dips and azimuths at each reliabilty location of the local dip vector and the structural dip vector (Pa16 and Pa17). The mean and standard deviations of the reliability magnitude for each structural dip vector (Pa18 and Pa19). This establishes a set of 19 parameters for which distances can be computed and will be denoted by Pa_i (i=1.19) below. The Z score variate is defined using 19 coefficients Co_i (i=1.19), some of which may be zero. For a given the local subvolume of interest, assume that there are M reliability locations and, therefore M structural dip vectors, Str_j (j=1 ... M) and M local dip vectors LocV_j (j=1 ... M).

The Z score variate for each location combination j,k, ZS_j_k (j=1 ... M, k=1 ... M) is ZS_j_k=sqrt(Sum for i=1 ... 19 (Co_i*(Pa_i(j)–Pa_i(k)) *(Pa_i(j)–Pa_i(k))))

where Pa_i(j) is the parameter Pa1 ... Pa19 computed at location j and where Pa_i(k) is the parameter Pa1 ... Pa19 computed at location k.

where each Co_i is a user specified constant, a user specified function of the input petrophysical data or a combination thereof.

For each local dip dp1_jj that is not a member of the set candidate flat spot dip vector, a variate is formed, Av_ZS_1_jj, as the average of ZS_j_k where j and k are indices from the set of indices jj of dp1. The mean and standard deviations of the variates Av_ZS_1_jj for all indices jj are denoted as Av_ZS_1_mn and Av_ZS_1_st, respectively.

For each local dip dp2_ee that is a member of the set candidate flat spot dip vector, a variate is formed, Av_ZS_2_ee, as the average of ZS_j_k where j and k are indices from the set of indices ee of dp2. The mean and standard deviations of the variates Av_ZS_2_ee for all indices ee are denoted as Av_ZS_2_mn and Av_ZS_2_st, respectively.

For each local dip dp2_ee that is a member of the set candidate flat spot dip vector, a variate is formed, Av_ZS_Cr_ee, as the average of ZS_j_k where j are indices from the set of indices jj of dp1 and k are indices from the set of indices ee of dp2. The mean and standard deviations of the variates Av_ZS_Cr_ee for all indices ee are denoted as Av_ZS_Cr_mn and Av_ZS_Cr_st, respectively.

Using the variates ZS_j_k, the original selection of the set of candidate flat spot dip vectors may be optimized, as a user option, in order to minimize Av_ZS_1_mn, Av_ZS_1_st, Av_ZS_2_mn and Av_ZS_2_st and to maximize Av_ZS_Cr_mn. The optimization is carried out using aggredational clustering where the distance between any two objects j and k is the variate ZS_j_k. After each repeated optimization clustering, the averages and standard deviations, Av_ZS_1_mn, Av_ZS_1_st, Av_ZS_2_mn, Av_ZS_2_st, Av_ZS_Cr_mn, Av_ZS_Cr_st, are re-computed and tested for minimization and stability. A new cluster is designated as the new set of candiate flat spot dip vectors if it is the cluster with the smallest Mahalanobis $D^2$ measure from it's centroid to the centroid of the flat spot direction vectors computed at the reliability locations within the local subvolume of interest.

Following optimization, the Behrens-Fisher test as described above may be applied to the variates Av_ZS_1_jj and Av_ZS_Cr_ee, and a significance measure computed for each dp2_ee.

Following optimization, the Behrens-Fisher test as described above may be applied to the variates Av_ZS_2_ee and Av_ZS_Cr_ee, and an alternative significance measure computed for each dp2_ee.

Following optimization, a significance measure computed for each dp2_ee may be alternatively computed using Av_ZS_Cr_ee as the test statistic in standard t_Test where the underlying normal distribution is defined using Av_ZS_1_mn and Av_ZS_1_st.

Following optimization, using Av_ZS_1_mn, Av_ZS_1_st a significance measure computed for each dp2_ee may be alternatively computed using Av_ZS_2_ee as a significance measure at a location ee called Sig_Stdev_at ee, using the equation:

Sig_Stdev_at ee=Absolute Value((*Av_ZS_1_mn*– *Av_ZS_2_ee*)/*Av_ZS_1_st*)

Following optimization, using Av_ZS_1_mn, Av_ZS_1_st a significance measure computed for each dp2_ee may be alternatively computed using Av_ZS_Cr_ee as a significance measure at a location ee called Sig_Stdev_at ee, using the equation:

Sig_Stdev_at ee=Absolute Value((*Av_ZS_1_mn*– *Av_ZS_Cr_ee*)/*Av_ZS_1_st*)

The choice of a specific user specified values of background levels, statistical cut-offs, statistical parameters and significance levels are made by the analyst or user based on geologic conditions, data integrity, noise level and the need to generate a geophyscially and geologically consistent set of statistical values.

A method useable herein is "On the Behrens-Fisher Problem: A Review". by Seock-Ho Kim and Allan Cohen. Second, by performing bivariate analysis of the candidate dip vectors having dip magnitudes within n standard deviations (n, real and >=0) of the expected flat spot dip magnitude, see reference "The significance of the difference between two means when the population variances are unequal" by B. L. Welch, 1938. Third, by selecting a population taken from those local dip vectors having azimuths which are within n standard deviations of structural dip azimuth, forming a histogram of dip angles, and finding the peaks of the histogram. If a peak exists within n expected flat spot standard deviations of the expected flat spot dip vector dip, then finding the closest peak to the flat spot dip vector dip. Using those vectors not part of the candidate flat spot peak, forming a mean and standard deviation of the background. Computing the expected background level within n standard deviations of the closest peak, subtracting the background from the original histogram and assigning a T statistic confidence level to each candidate dip vector. The fourth method of analysis involves using either multiple discriminate analysis or logistic regression to reject members from the set of candidate flat spot dip vectors and to compute a significance measure for each remaining member. The choice of a specific user specified values of background levels, statistical cut-offs, statistical parameters and significance levels are made by the analyst or user based on geologic conditions, data integrity, noise level and the need to generate a geophyscially and geologically consistent set of statistical values.

Figure 8:
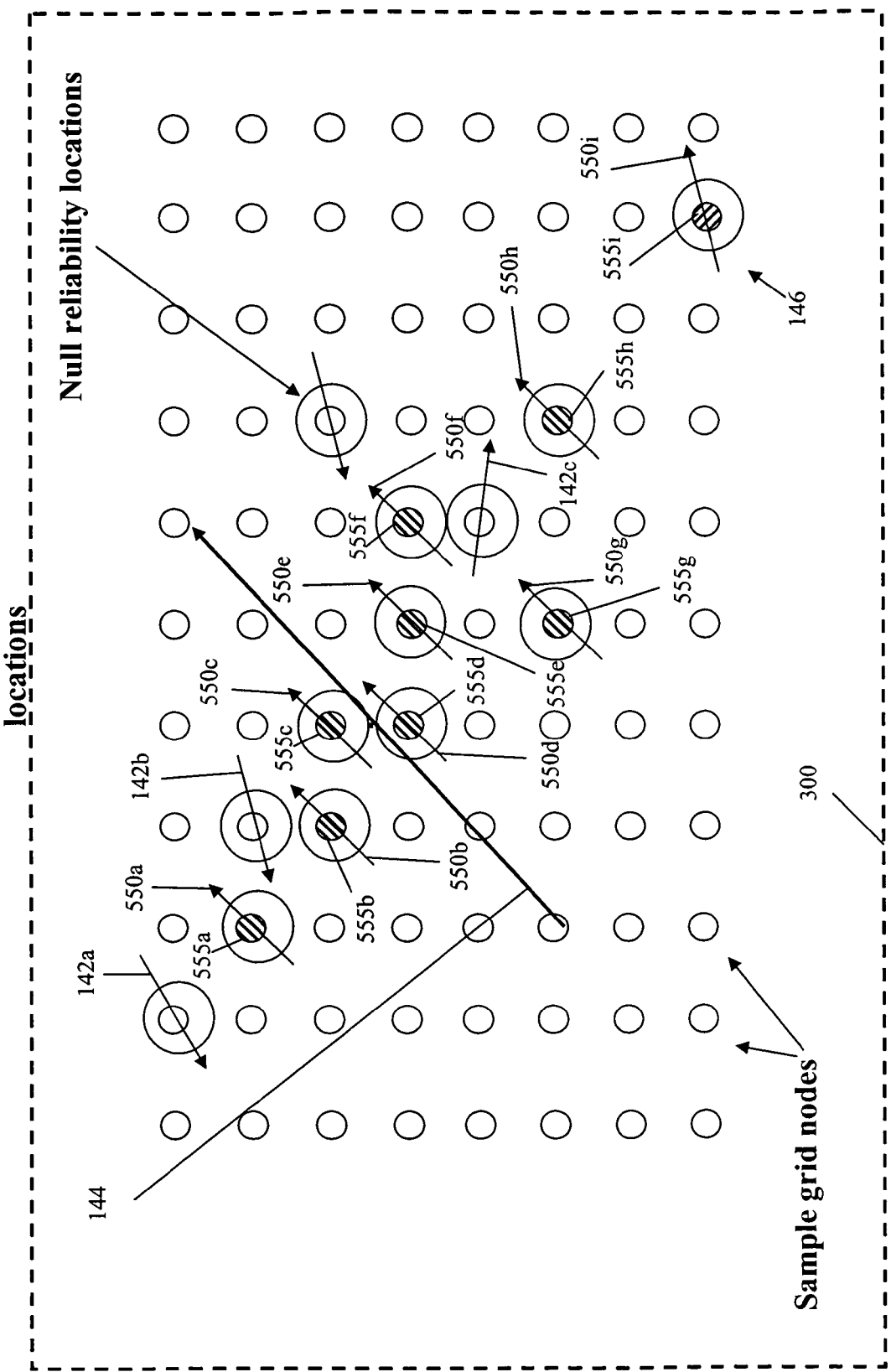
FIG. 8 depicts an exemplary 3D output subvolume created by an embodiment of the invention.

A 3D output subvolume is formed containing one or more significance measures for all vectors in the set of candidate flat spot dip vectors. FIG. 8 depicts a 3D output subvolumes created by an embodiment of the application. The 3D seismic Output Volume Slice in a surface containing flat spot dip vectors at reliability locations. The hatched circles describe reliability locations with significance measures sufficient to be considered to be signal above the background. The empty circles describe reliability locations with significance measures outside of a user specified acceptance range. Element 144 points to a flat spot direction vector while 550*i* points to local dip vector at a reliability location that is part of a parallel set. More specifically, FIG. 8 shows grid nodes which have reliability locations circled. Within the reliability locations, there are hatched and non-hatched circles. The hatched circles means that there are significance measures at that reliability location, the open circles or "non-hatched" circles means there are no significance measures at that reliability location.

It should be noted that the 3D output subvolume can be made of not only the significance measures noted above, but additional null and non-null values which represent locations in the 3D output volume which were not reliability locations in the local subvolume of interest, locations in the local subvolume of interest which were not selected to be members of a set of candidate flat spot dip vectors and/or locations of members of a set of candidate flat spot dip vectors whose significance measure is outside a user specified range of acceptable values.

It also should be noted that the method can be repeated iteratively for each reliability location within each focused subvolume of interest.

The method can be repeated iteratively for each focused subvolume within the input 3D seismic attribute dataset limits.

Figure 9:
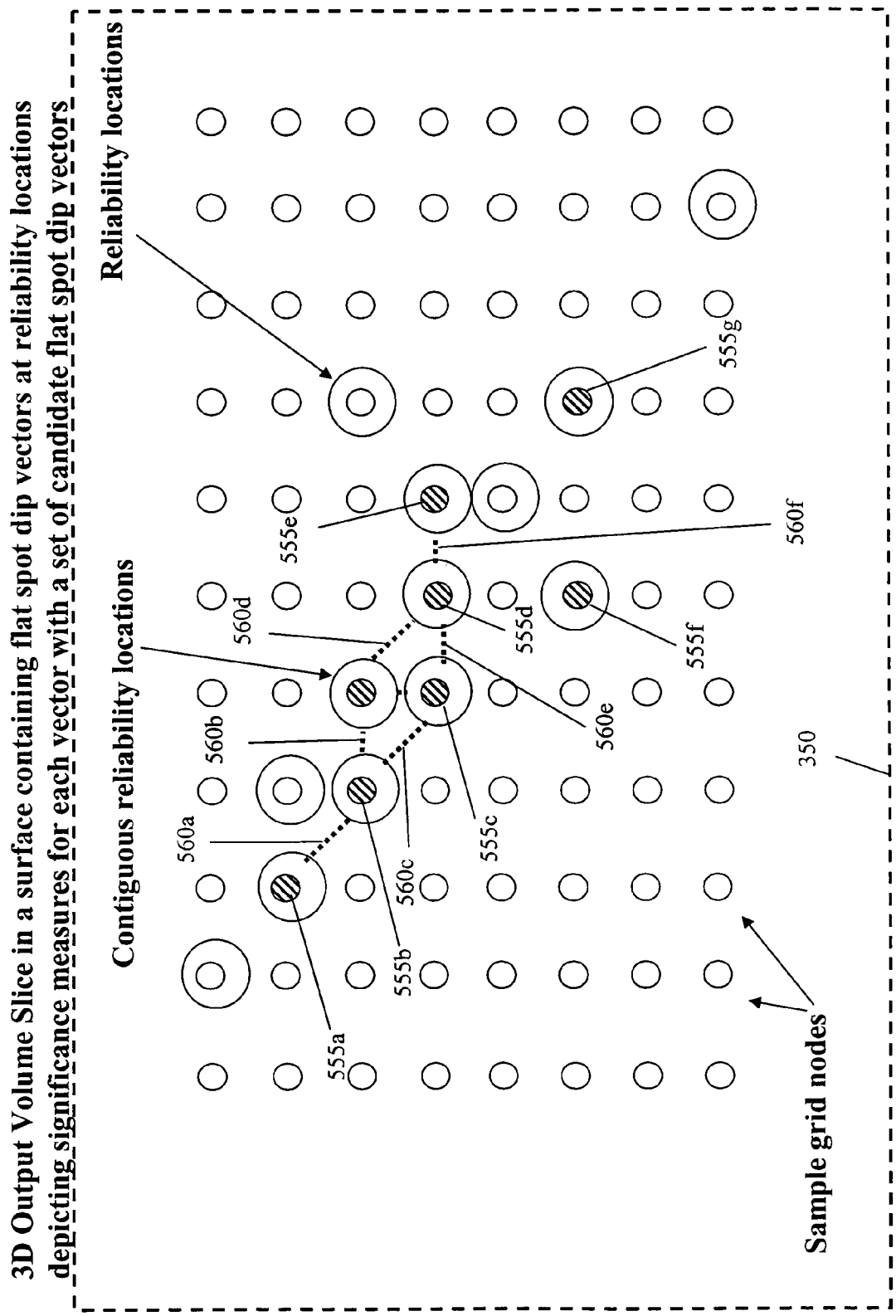
FIG. 9 shows an exemplary identified contiguous reliability location significance measures computed for the 3D output volume using the data of FIG. 8

The 3D output volume is interpreted to identify contiguous reliability location rates of change across a geological structure for non-null values of the 3D output volume. FIG. 9 show an identified contiguous reliability location rate of change computed from the 3D output volume using the data from FIG. 8. In FIG. 9, the hatched circles show reliability locations with significance measures sufficient to be considered to be signal above the background. The dotted lines 560a-560f connects members of the group of contiguous significance measure locations.

In one embodiment the candidate of flat spot dip vectors is formed using multivariate cluster analysis.

In another embodiment the significance measure for each member of the set of candidate flat spot dip vectors is computed using multiple discriminate analysis or logistic regression.

It is anticipated that user specified distances, such as the number of grid node locations, positive and negative, along the coordinate axes can be used to determine the sizes of local subvolumes of interest around each reliability location in the focused subvolume of interest.

Figure 10:
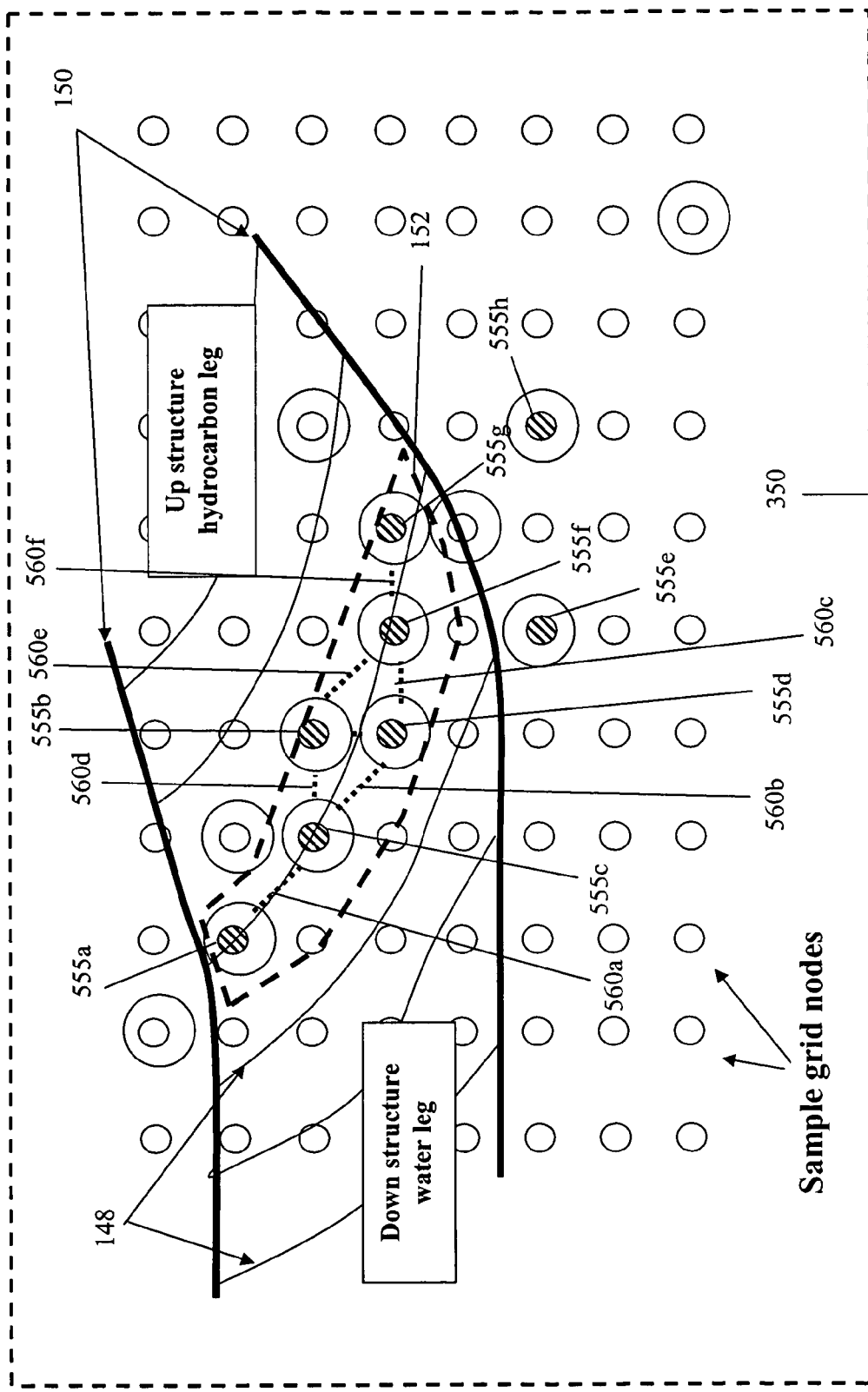
FIG. 10 shows a plurality of contiguous significance locations which highlight water to hydrocarbon interfaces in subsurface geological structures according to an embodiment of the invention.

An embodiment of the invention contemplates using 3D output volumes to generate a plurality of contiguous significance locations which highlight water to hydrocarbon interfaces and hydrocarbon to hydrocarbon interfaces in subsurface geological structures, as shown in FIG. 10. FIG. 10 shows a 3D seismic output volume 350 in a surface containing significance measures at reliability locations. Hatched circles show reliability locations with significance measures sufficient to be considered to be signal above background and connected as a group of contiguous significance measure locations. The dashed lines show an area encircling an interpreted fluid contact. Element 148 shows examples of geological contours with element 150 showing an example of geologic faults. Element 152 shows interpreted fluid contact level.

It is contemplated that at least one group of contiguous significant locations can be formed and then a mean value for significance measure for each group can be determined and then standard deviations for significance measure for each group can be computed in order to compute an average significance level for a contiguous group. The average significance levels can be used to sort among contiguous groups in order to manage future technical work.

In one embodiment of the method the dip vectors are derived from a seismic attribute selected from the group: seismic attribute, amplitude variation with offset analysis, seismic inversion results, seismic amplitude, seismic amplitude raised to a real power, instantaneous phase, reflection strength and/or coherence.

In an alternate embodiment instead of seismic attribute data, derived rock property data is used to derive dip vectors at reliability locations.

In one embodiment the method is embodied as a sequence of computer programs.

The significance values for each set of candidate flat spot dip vectors each reliability locations are stored. The significance values can include null values for all non-reliability locations within the focused subvolume of interest forming a 3D output volume.

The present embodiments relate to improvements in the scanning of multiple volumes of geophysical data in order to search for anomalous data points related to flat spots and fluid contact effects. The anomalous data points can be related to the presence of hydrocarbon or water bearing strata at the corresponding depth locations of the data points.

The embodied methods operate on subtle hydrocarbon indicators. The embodied methods fully characterize the hydrocarbon fluid contact inner and outer edges. The embodied methods can be used determine the errors and uncertainties in all measurements and data attribute results relative to a given hydrocarbon reservoir and the corresponding water reservoir interfacial region.

The method stores output data set to find discrete sampling locations with specific geophysical responses. Anomalous data points, depicted by the significance measures at sampling locations, can be related to the presence of interfacial regions between hydrocarbon and hydrocarbon bearing strata and/or between hydrocarbon and water bearing strata at the corresponding depth locations of the data points.

In an alternative embodiment, the method of selecting the focus sub-volume can include an element of randomness in order to obtain a more objective analysis of the geophysical data sets. The method of selecting the focus sub-volume can further include a systematic element in order to ensure that all points of interest in a three-dimensional seismic survey volume are analyzed.

The described method utilizes a proximal approach in which each focus sub-volume is proximal to the previous. The benefit of the proximal approach is that the approach ensures that each point of interest in a three-dimensional seismic survey volume can be analyzed. The benefit of the proximal approach is that computer programs can be made to run as very efficient parallel processes.

Alternatively, the invention contemplates using a systematic approach. The systematic approach is performed by selecting subsequent focus sub-volumes that are adjacent and below and/or above the previous focus sub-volume. Once the focus sub-volumes reach the bottom of a survey volume, the systematic approach chooses a focus sub-volume adjacent and to the side of focus sub-volume in the previous "column". Subsequent focus sub-volumes and chosen below and/or above the previous focus sub-volumes until that "column" in the survey volume is analyzed. This systematic approach analyzes the data by processing data in "columns" then "rows" to ensure that each point of interest in a three-dimensional seismic survey volume is analyzed.

Figure 11:
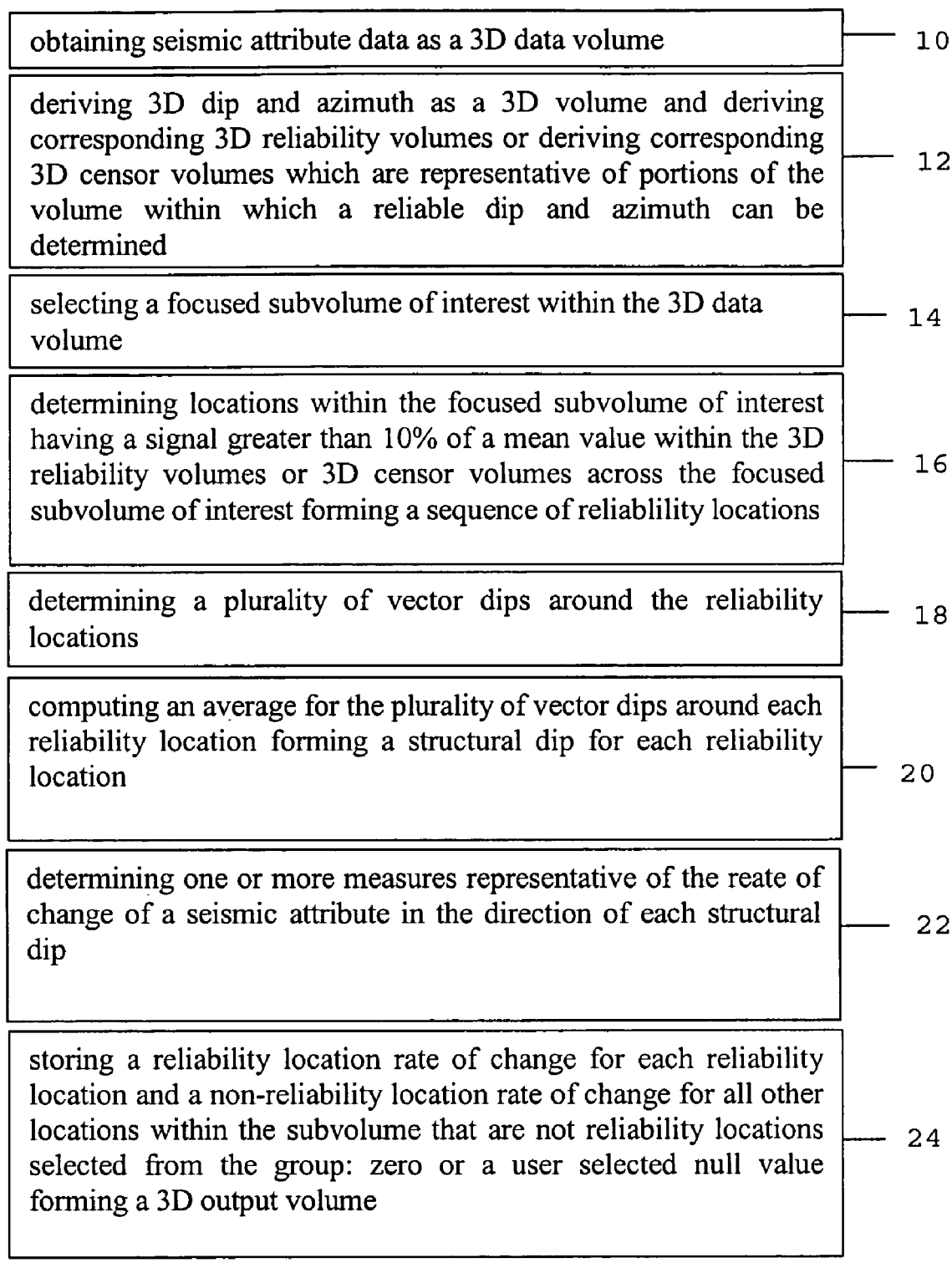
FIG. 11 is a flow chart depicting an embodiment of the invention.

FIG. 11 is a flow chart of the method of the invention.

The method of the application begins with obtaining 3D dip and azimuth data 10.

The next step 12 involves deriving 3D dip and azimuth data and deriving corresponding 3D reliability volumes 12 or deriving corresponding 3D censor volumes 114.

Next the method continues with step 14, the step of selecting a focused subvolume of interest within the 3D data volume.

Following step 14 is step 16, determining locations within the focused subvolume of interest having a signal greater than a user specified value (like 10% of a mean value within the 3D reliability volumes or 3D censor volumes) across the focused subvolume of interest forming a sequence of reliability locations.

Step 18 involves determining a plurality of vector dips around the reliability locations and identifying a local subvolume of interest interior to the focused subvolume of interest for each reliability location wherein the local subvolume of interest contains 3D dip and azimuth data as a set of vectors.

Step 20 involves computing an average for the plurality of vector dips around each reliability location forming a structural dip with a structural dip azimuth, and a structural dip magnitude for each reliability location and selection a local set which have similar azimuths.

Step 20 also determines a standard deviation of the components of each structural dip vector for each reliability location In Step 20, a set of local vectors is formed from a set of vectors that are within a user specified deviation from the azimuth (like 1 standard deviation of the azimuth) of the structural dip vector in order to determine dip magnitudes for each vector within the set of local vectors.

Step 22 involves computing an expected flat spot dip vector magnitude and constructing a histogram of all dip vector magnitudes for the members of the local set of.

Step 22 further involves forming a histogram of the dip magnitudes of the vectors within the set of local vectors.

In step 22, also computes a flat spot direction vector for each structural dip vector at the reliability location is formed. In addition to determining a flat spot direction vector for each structural dip vector at the reliability location, wherein the flat spot direction vector has a flat spot direction vector azimuth equaling to +/−1 standard deviation of the structural azimuth, or equaling a similarly user specified amount Step 22 involves computing a flat spot direction vector dip magnitude from the structural dip magnitude using (1) petrophysical data at each reliability location, or (2) a user specified value of, for example +/−20%, of the structural dip magnitude for each reliability location.

A flat spot direction vector dip magnitude error quantity is identified in Step 138.

A set of candidate flat spot dip vectors when one or more local vectors are within the local subvolume of interest was created in Step 20 wherein one or more local vectors are statistically consistent with the flat spot direction vector.

In Step 24, a significance measure for each vector within the set of candidate flat spot dip vectors, is determined. Each significant measure has a significance location corresponding to each local vector within the set of candidate flat spot dip vectors Step 26 is the step wherein the 3D output subvolume is formed that is made up of significance measures for all vectors in the set of candidate flat spot dip vectors.

Step 28 shows the iterative repeat of the steps.

Step 30 depicts the interpretation step of the 3D output volumes to identify contiguous reliability locations of significance measures across a geological structure for non-null values of the 3D output volume.

It should be noted that the invention applies to a method and to computer instructions on computer readable media which instruct a processor to perform the steps of the method.

Figure 12:
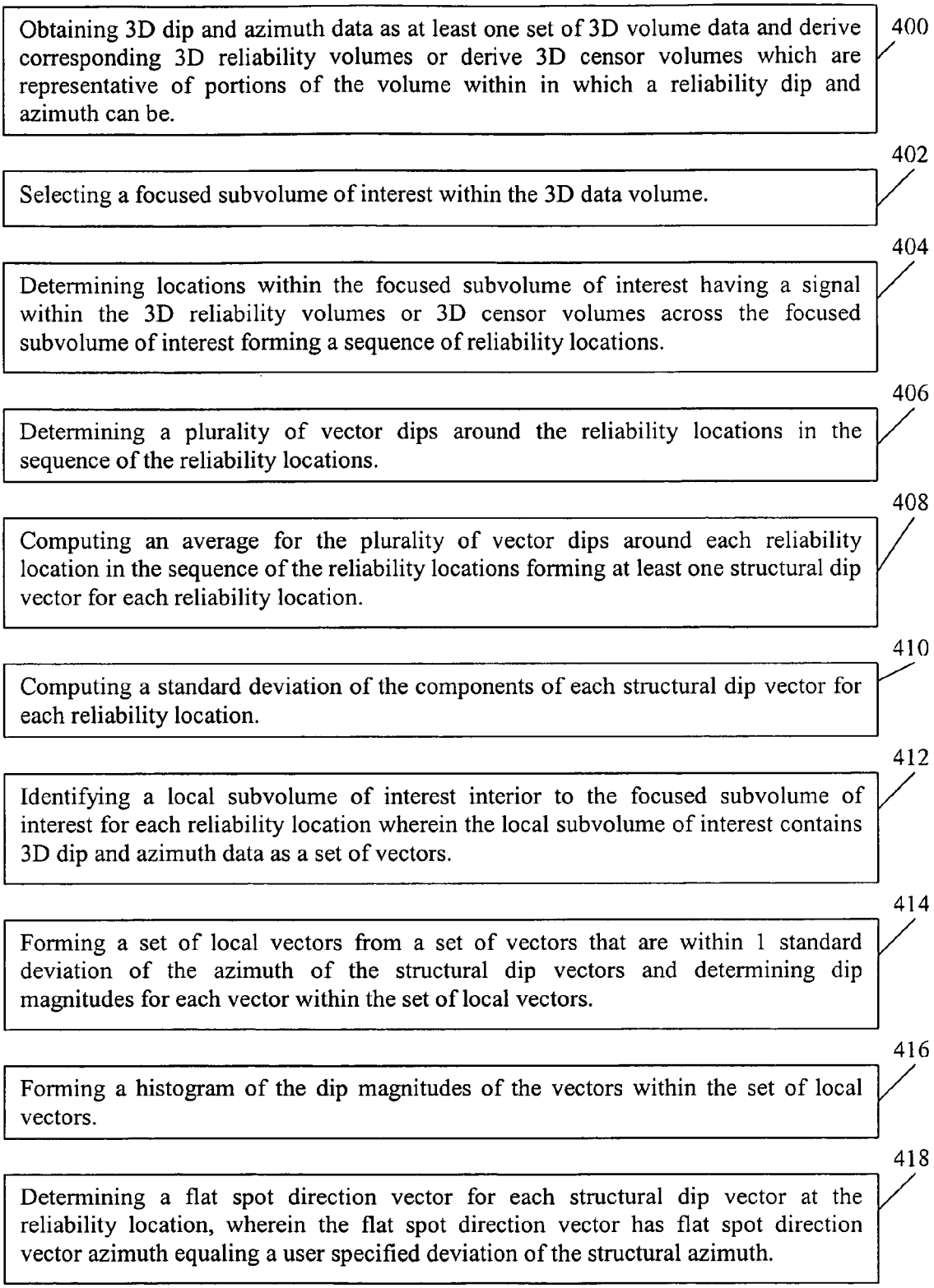
FIG. 12 is a flow chart depicting an alternate embodiment of the invention.

In an alternate embodiment in FIG. 12 depicts an alternate method of performing the method. Element 400 obtains 3D dip and azimuth data as at least one set of 3D volume data and derive corresponding 3D reliability volumes or derive 3D censor volumes which are representative of portions of the volume within in which a reliability dip and azimuth can be. Element 402 selects a focused subvolume of interest within the 3D data volume. Element 404 determines locations within the focused subvolume of interest having a signal within the 3D reliability volumes or 3D censor volumes across the focused subvolume of interest forming a sequence of reliability locations. Element 406 determines a plurality of vector dips around the reliability locations in the sequence of the reliability locations. Element 408 computes an average for the plurality of vector dips around each reliability location in the sequence of the reliability locations forming at least one structural dip vector for each reliability location. Element 410 computes a standard deviation of the components of each structural dip vector for each reliability location. Element 412 identifies a local subvolume of interest interior to the focused subvolume of interest for each reliability location wherein the local subvolume of interest contains 3D dip and azimuth data as a set of vectors. Element 414 forms a set of local vectors from a set of vectors that are within 1 standard deviation of the azimuth of the structural dip vectors and determining dip magnitudes for each vector within the set of local vectors. Element 416 forms a histogram of the dip magnitudes of the vectors within the set of local vectors. Element 418 determines a flat spot direction vector for each structural dip vector at the reliability location, wherein the flat spot direction vector has flat spot direction vector azimuth equaling a user specified deviation of the structural azimuth. Element 420 computes a flat spot direction vector dip magnitude from the structural dip magnitude using (1) petrophysical data at each reliability location, or (2) a user specified value of the structural dip magnitude for each reliability location. Element 422 determines a flat spot direction vector dip magnitude error quantity. Element 424 forms a set of candidate flat spot dip vectors when one or more local vectors are within the local subvolume of interest and the one or more local vectors are statistically consistent with the flat spot direction vector. Element 426 computes a significance measure for each vector within the set of candidate flat spot dip vectors, wherein each significant measure has a significance location corresponding to each local vector within the set of candidate flat spot dip vectors. Element 426 forms a 3D output subvolume comprising the significance measures for all vectors in the set of candidate flat spot dip vectors.

In discussing this method, several terms require consistent definition. The water reservoir is a geologic rock formation having both porosity and permeability and saturated primarily by water. The water formation may contain a partial hydrocarbon saturation, but at a sufficiently low level so as to preclude economic development.

Similarly, the hydrocarbon reservoir is a geologic rock formation having both porosity and permeability and saturated in most cases by a combination of water and hydrocarbons. The saturation of hydrocarbons must be sufficiently high so as to allow economic development. If the saturation of hydrocarbons does not allow the production of hydrocarbons and associated water in quantities that are commercial, the reservoir would not be called a hydrocarbon reservoir. Typically, the hydrocarbon reservoir is found up-structure of the water reservoir, which is located down-structure. In this discussion, up-structure refers to shallower depths from the surface within the earth. Down-structure refers to deeper depths within the earth. In the case of seismic travel times, deeper depths correspond to larger absolute value seismic travel times and shallower depths to smaller absolute value travel times.

Both depths and seismic travel times are typically measured from a specified datum. The datum is a specified surface to which measurements are referenced. For example, in offshore exploration and production, the datum is typically taken to be mean sea level. Depths or seismic times are then referenced to mean sea level as the datum.

The seismic data volumes used in the analysis can be generated from any defined attribute generating algorithm. Examples of data that can be analyzed in seismic volume format include seismic velocity data processed using a defined attribute generating algorithm, a set of geophysical gravity data extract, compiled or collected for a 3D volume, or a set of petro-physical measurements, such as resistively, for a 3D volume of interest.

The 3D seismic data file can be a set of compiled seismic reflection data, processed using a defined attribute generating algorithm and extracted for, in relation to or in conjunction with a sub-volume of interest or a set of compiled seismic velocity data processed using a defined attribute generating algorithm and extracted for or in conjunction with a sub-volume of interest. This data can be processed to extract internal structures within the data, as in amplitude variation with recording offset or NMO velocity. Such specialized extractions stored in a 3D volume format can be suitable as input to these embodied methods.

The present embodiments relate to a method of determining the existence of and location of hydrocarbon and water fluid contacts by analyzing spatial changes in 3D seismic data. The method obtains 3D dip data and azimuth data as at least one set of 3D volume data and deriving corresponding 3D reliability volumes or deriving 3D censor volumes which are representative of portions of the at least one set of 3D volume data within which 3D dip data and azimuth data can be reliably computed. The method additionally selects a focused subvolume of interest within the at least one set of 3D volume data. The method can additionally determine reliability locations within the focused subvolume of interest having non-null 3D dip data and non-null 3D azimuth data within the 3D reliability volumes or 3D censor volumes across the focused subvolume of interest forming a sequence of reliability locations. The method computes an average for a plurality of vector dips around each reliability location in the sequence of the reliability locations forming at least one structural dip vector for each reliability location. The method can identify a local subvolume of interest interior to the focused subvolume of interest for each reliability location wherein the local subvolume of interest contains 3D dip data and azimuth data as a set of vectors. The method can additionally determine a flat spot direction vector for each structural dip vector at each reliability location. The method can additionally form a set of candidate flat spot dip vectors from at least one vector in the set of vectors within the local subvolume of interest and the at least one vector in the set of vectors are statistically consistent with the flat spot direction vector. The method additionally computes a significance measure for each vector within the set of candidate flat spot dip vectors. The method also forms and stores a 3D output subvolume comprising significance measures for all vectors in the set of candidate flat spot dip vectors. The method then repeats the method for all 3D volume data forming a 3D output volume.

In an alternate embodiment the method can after determining a flat spot direction vector for each structural dip vector, a flat spot direction vector dip magnitude error quantity is calculated.

In yet another embodiment the method can after an average for a plurality of vector dips is computed, a standard deviation of X-Y-Z components for each structural dip vector for each reliability location is computed. This enables fast and accurate computation of the significance measure and candidate flat spot dip vectors.

In an alternate embodiment the flat spot direction vector is computed from each structural dip vector using (1) petro-physical data at each reliability location, or (2) a user specified value for each structural dip vector for each reliability location.

Additionally the method can after a local subvolume of interest is identified, a set of local vectors within 1 standard deviation of the azimuth of the flat spot direction vector of at least one vector in the set of vectors is determined and dip magnitudes for each vector within the set of local vectors is computed.

An embodiment can further comprise the step of interpreting the 3D output volume to identify contiguous reliability location significance measures across a geologic structure for non-null values of the 3D output volume.

In one embodiment the user specifies distances, positive and negative, along coordinate axes of focused subvolumes of interest to determine sizes of local subvolumes of interest around each reliability location.

In an alternate embodiment the method can utilize 3D output volume to generate a plurality of contiguous significance locations which highlight water to hydrocarbons interfaces in subsurface geological structures.

In yet another embodiment the method can include the step of forming at least one group of contiguous significance locations and then determining a mean value for significance measures for each group and then determining standard deviations for significance measures for each group.

In one embodiment the set of candidate flat spot dip vectors is formed using multivariate cluster analysis.

In yet another embodiment the significance measure for each member of the set of candidate flat spot dip vectors is computed using multiple discriminate analysis or logistic regression.

One embodiment involves computer instructions on a computer readable media, comprising instructions to cause a processor to determine the existence of and location of hydrocarbon and water fluid contacts by analyzing spatial changes in 3D seismic data. The method can obtain 3D dip data and azimuth data as at least one set of 3D volume data and deriving corresponding 3D reliability volumes or deriving 3D censor volumes which are representative of portions of the at least one set of 3D volume data within which 3D dip data and azimuth data can be reliably computed. the method can additionally select a focused subvolume of interest within the at least one set of 3D volume data. The method can then determine reliability locations within the focused subvolume of interest having non-null 3D dip data and non-null 3D azimuth data within the 3D reliability volumes or 3D censor volumes across the focused subvolume of interest forming a sequence of reliability locations. The method can additionally compute an average for a plurality of vector dips around each reliability location in the sequence of the reliability locations forming at least one structural dip vector for each reliability location. The method can additionally identify a local subvolume of interest interior to the focused subvolume of interest for each reliability location wherein the local subvolume of interest contains 3D dip data and azimuth data as a set of vectors. The method can then determine a flat spot direction vector for each structural dip vector at each reliability location. It is possible for the method to form a set of candidate flat spot dip vectors from at least one vector in the set of vectors within the local subvolume of interest and the at least one vector in the set of vectors are statistically consistent with the flat spot direction vector. The method can additionally compute a significance measure for each vector within the set of candidate flat spot dip vectors. It is possible for the method to form and store a 3D output subvolume comprising significance measures for all vectors in the set of candidate flat spot dip vectors. The method can additionally repeate the method for all 3D volume data forming a 3D output volume.

In one embodiment the computer instructions on computer readable media can utilize 3D output subvolume to further comprise additional null values and non-null values.

In an alternate embodiment the computer instructions on computer readable media can cause the processor to repeat the following steps for each reliability location within each focused subvolume of interest. The steps will include identifying a local subvolume of interest interior to the focused subvolume of interest for each reliability location wherein the local subvolume of interest contains 3D dip and azimuth data as a set of vectors. The steps can also include forming a set of local vectors from a set of vectors that are within 1 standard deviation of the azimuth of the structural dip vector, or within a similarly user specified amount of deviation from the structural dip azimuth, and determining dip magnitudes for each vector within the set of local vectors. The steps can also form a histogram of the dip magnitudes of the vectors within the subset of vectors; determining a flat spot direction vector for each structural dip vector at the reliability location, wherein the flat spot direction vector has a flat spot direction vector azimuth equaling a similarly user specified amount. The steps can also compute a flat spot direction vector dip magnitude from the structural dip magnitude using (1) petrophysical data at each reliability location, or (2) a user specified value of the structural dip magnitude for each reliability location. The steps can additionally determine a flat spot direction vector dip magnitude error quantity. The steps also additionally can form a set of candidate flat spot dip vectors when one or more local vectors are within the local subvolume of interest and the one or more local vectors are statistically consistent with the flat spot direction vector. It is possible for the steps to compute a significance measure for each vector within the set of candidate flat spot dip vectors. It is additionally possible for the steps to form a 3D output subvolume comprising the significance measures for all vectors in the set of candidate flat spot dip vectors.

In one embodiment the computer instructions on computer readable media can further comprise the instruction of causing the processor to interpret the 3D output volume to identify contiguous reliability location rates of change across a geologic structure for non-null values of the 3D output volume.

In an alternate embodiment the computer instructions on computer readable media can further comprise the instruction, wherein the processor utilizes user specified distances, positive and negative, along the coordinate axes to determine sizes of local subvolumes of interest around each reliability location.

It is possible for the computer instructions on computer readable media to cause the processor to use the 3D output volume to generate a plurality of contiguous significance locations which highlight water to hydrocarbons interfaces in subsurface geological structures It is additionally possible for the computer instructions on computer readable media to include an instruction to the processor to form at least one group of contiguous significance locations and then determining a mean value for significance measures for each group and then determining standard deviations for significance measures for each group.

In one embodiment the computer instructions on computer readable media can provide instructions advising the processor to perform the steps of the method iteratively to all 3D seismic data on the earth.

While this method has been described with emphasis on the preferred embodiments, it should be understood that within the scope of the appended claims, the method might be practiced other than as specifically described herein.

What is claimed is:

1. A method of determining the existence of and location of hydrocarbon and water fluid contacts by analyzing spatial changes in 3D seismic data comprising the steps of:
   a. obtaining 3D dip data and azimuth data as at least one set of 3D volume data and deriving corresponding 3D reliability volumes or deriving 3D censor volumes which are representative of portions of the at least one set of 3D volume data within which 3D dip data and azimuth data can be reliably computed;
   b. selecting a focused subvolume of interest within the at least one set of 3D volume data;
   c. determining reliability locations within the focused subvolume of interest having non-null 3D dip data and non-null 3D azimuth data within the 3D reliability volumes or 3D censor volumes across the focused subvolume of interest forming a sequence of reliability locations;
   d. computing an average for a plurality of vector dips around each reliability location in the sequence of the reliability locations forming at least one structural dip vector for each reliability location;
   e. identifying a local subvolume of interest interior to the focused subvolume of interest for each reliability location wherein the local subvolume of interest contains 3D dip data and azimuth data as a set of vectors;
   f. determining a flat spot direction vector for each structural dip vector at each reliability location;
   g. forming a set of candidate flat spot dip vectors from at least one vector in the set of vectors within the local subvolume of interest and the at least one vector in the set of vectors are statistically consistent with the flat spot direction vector;
   h. computing a significance measure for each vector within the set of candidate flat spot dip vectors;
   i. forming and storing a 3D output subvolume comprising significance measures for all vectors in the set of candidate flat spot dip vectors;
   j. repeating the method for all 3D volume data forming a 3D output volume.

2. The method of claim 1, wherein after determining a flat spot direction vector for each structural dip vector, a flat spot direction vector dip magnitude error quantity is calculated.

3. The method of claim 1, wherein after an average for a plurality of vector dips is computed, a standard deviation of X-Y-Z components for each structural dip vector for each reliability location is computed.

4. The method of claim 1, wherein the flat spot direction vector is computed from each structural dip vector using (1)

petrophysical data at each reliability location, or (2) a user specified value for each structural dip vector for each reliability location.

5. The method of claim 1, wherein after a local subvolume of interest is identified, a set of local vectors within 1 standard deviation of the azimuth of the flat spot direction vector of at least one vector in the set of vectors is determined and dip magnitudes for each vector within the set of local vectors is computed.

6. The method of claim 1, further comprising the step of interpreting the 3D output volume to identify contiguous reliability location significance measures across a geologic structure for non-null values of the 3D output volume.

7. The method of claim 1, further comprising using user specified distances, positive and negative, along coordinate axes of focused subvolumes of interest to determine sizes of local subvolumes of interest around each reliability location.

8. The method of claim 1, further comprising using the 3D output volume to generate a plurality of contiguous significance locations which highlight water to hydrocarbons interfaces in subsurface geological structures.

9. The method of claim 8, further comprising the step of forming at least one group of contiguous significance locations and then determining a mean value for significance measures for each group and then determining standard deviations for significance measures for each group.

10. The method of claim 1, wherein the set of candidate flat spot dip vectors is formed using multivariate cluster analysis.

11. The method of claim 1, wherein the significance measure for each member of the set of candidate flat spot dip vectors is computed using multiple discriminate analysis or logistic regression.

12. Computer instructions on a computer readable media, comprising instructions to cause a processor to determine the existence of and location of hydrocarbon and water fluid contacts by analyzing spatial changes in 3D seismic data by performing the steps of:
   a. obtaining 3D dip data and azimuth data as at least one set of 3D volume data and deriving corresponding 3D reliability volumes or deriving 3D censor volumes which are representative of portions of the at least one set of 3D volume data within which 3D dip data and azimuth data can be reliably computed;
   b. selecting a focused subvolume of interest within the at least one set of 3D volume data;
   c. determining reliability locations within the focused subvolume of interest having non-null 3D dip data and non-null 3D azimuth data within the 3D reliability volumes or 3D censor volumes across the focused subvolume of interest forming a sequence of reliability locations;
   d. computing an average for a plurality of vector dips around each reliability location in the sequence of the reliability locations forming at least one structural dip vector for each reliability location;
   e. identifying a local subvolume of interest interior to the focused subvolume of interest for each reliability location wherein the local subvolume of interest contains 3D dip data and azimuth data as a set of vectors;
   f. determining a flat spot direction vector for each structural dip vector at each reliability location;
   g. forming a set of candidate flat spot dip vectors from at least one vector in the set of vectors within the local subvolume of interest and the at least one vector in the set of vectors are statistically consistent with the flat spot direction vector;
   h. computing a significance measure for each vector within the set of candidate flat spot dip vectors;
   i. forming and storing a 3D output subvolume comprising significance measures for all vectors in the set of candidate flat spot dip vectors;
   j. repeating the method for all 3D volume data forming a 3D output volume.

13. The computer instructions on computer readable media of claim 12, further comprising the instructions, wherein the 3D output subvolume further comprises additional null values and non-null values.

14. The computer instructions on computer readable media of claim 12, further comprising causing the processor to repeat the following steps for each reliability location within each focused subvolume of interest:
   a. identifying a local subvolume of interest interior to the focused subvolume of interest for each reliability location wherein the local subvolume of interest contains 3D dip and azimuth data as a set of vectors;
   b. forming a set of local vectors from a set of vectors that are within 1 standard deviation of the azimuth of the structural dip vector, or within a similarly user specified amount of deviation from the structural dip azimuth, and determining dip magnitudes for each vector within the set of local vectors;
   c. forming a histogram of the dip magnitudes of the vectors within the subset of vectors; determining a flat spot direction vector for each structural dip vector at the reliability location, wherein the flat spot direction vector has a flat spot direction vector azimuth equaling a similarly user specified amount;
   d. computing a flat spot direction vector dip magnitude from the structural dip magnitude using (1) petrophysical data at each reliability location, or (2) a user specified value of the structural dip magnitude for each reliability location;
   e. determining a flat spot direction vector dip magnitude error quantity;
   f. forming a set of candidate flat spot dip vectors when one or more local vectors are within the local subvolume of interest and the one or more local vectors are statistically consistent with the flat spot direction vector;
   g. computing a significance measure for each vector within the set of candidate flat spot dip vectors; and
   h. forming a 3D output subvolume comprising the significance measures for all vectors in the set of candidate flat spot dip vectors.

15. The computer instructions on computer readable media of claim 12, further comprising the instruction of causing the processor to interpret the 3D output volume to identify contiguous reliability location rates of change across a geologic structure for non-null values of the 3D output volume.

16. The computer instructions on computer readable media of claim 12, further comprising the instruction, wherein the processor utilizes user specified distances, positive and negative, along the coordinate axes to determine sizes of local subvolumes of interest around each reliability location.

17. The computer instructions on computer readable media of claim 12, further comprising instruction which cause the processor to use the 3D output volume to generate a plurality of contiguous significance locations which highlight water to hydrocarbons interfaces in subsurface geological structures.

18. The computer instructions on computer readable media of claim 12, further comprising an instruction to the processor to form at least one group of contiguous significance locations and then determining a mean value for significance measures for each group and then determining standard deviations for significance measures for each group.

19. The computer instructions on computer readable media of claim 12, wherein the instructions advise the processor to perform the steps of the method iteratively to all 3D seismic data on the earth.

* * * * *